Patented Mar. 12, 1929.

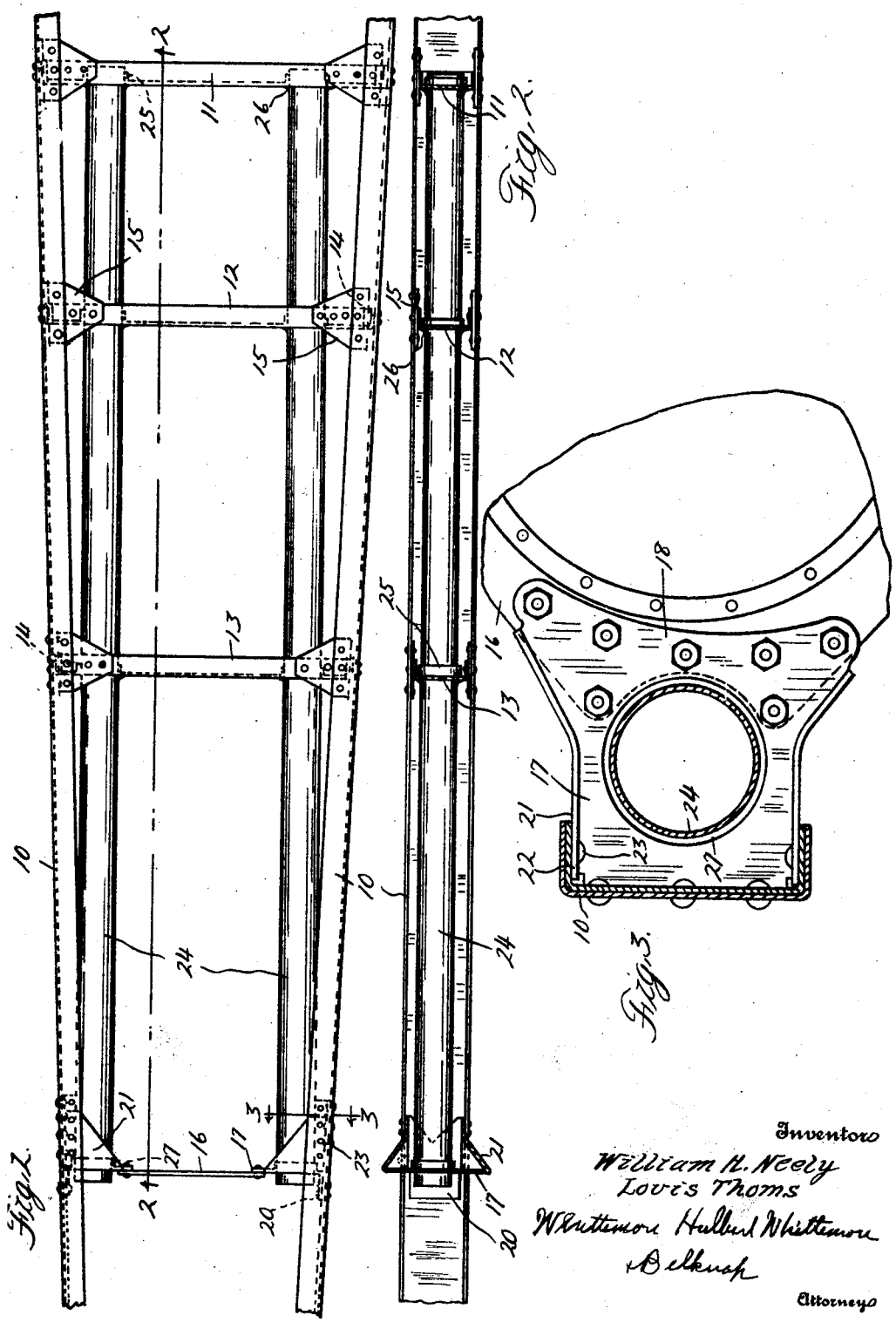

1,704,928

UNITED STATES PATENT OFFICE.

LOUIS THOMS AND WILLIAM H. NEELY, OF DETROIT, MICHIGAN, ASSIGNORS TO GRAHAM BROTHERS, INC., OF EVANSVILLE, INDIANA, A CORPORATION OF INDIANA.

CHASSIS OR FRAME CONSTRUCTION.

Application filed November 29, 1926. Serial No. 151,555.

The invention relates to chassis or frame constructions and more particularly to improvements therein involving a novel construction and arrangement of longitudinally extending torsional members.

The present invention contemplates a structure including longitudinally extending tubular torsional members arranged substantially parallel and adjacent to the side sill or rail members of the chassis and operatively associated with two or more cross frame members one of which constitutes the rear engine support. In the illustrative embodiment of the invention herein shown and described, each torsional member is rigidly non-rotatably connected at one end to the rear engine support and at the other to a cross frame member and extends through and is supported by one or more cross members intermediate its ends but is not non-rotatably connected to these intermediate cross members.

By such an arrangement numerous noteworthy advantages are attained concerning the strength, rigidity and durability of the chassis. For instance by this arrangement the disastrous weaving and other objectionable stresses imparted to the chassis are resisted by these torsional members and consequently reduced to a minimum. Furthermore by extending the torsional members through the intermediately arranged cross members the side sills of the chassis are supported against vertical as well as horizontal forces. Still another important advantage results from the connection between these torsional members and the rear engine support because by such an arrangement additional support is given to the engine. However, all of the advantages, in so far as torsional rigidity is concerned, is in the frame independent of the engine mounting.

The several objects, advantages and novel details of construction and arrangement of parts will be made more apparent as this description proceeds especially when considered in connection with the accompanying drawings wherein;

Figure 1 is a top plan view of a chassis or frame constructed in accordance with our invention.

Figure 2 is an enlarged fragmentary longitudinal sectional view taken substantially on the plane indicated by line 2—2 in Figure 1 and Figure 3 is an enlarged fragmentary transverse sectional view taken substantially on the plane indicated by line 3—3 in Figure 1.

Referring now particularly to the drawing wherein like reference characters indicate like parts it will be noted that there is illustrated the chassis or frame of a vehicle which includes a pair of longitudinally extending spaced side sills or rails 10 of customary channel shape in cross section, rigidly united and secured in spaced relation by a suitable number of cross frame members. Among these cross frame members are included cross members 11, 12 and 13 arranged at longitudinally spaced intervals. In the illustrative embodiment of the invention as herein shown and described each of these cross members consists essentially of a bar U-shaped or channel-shaped in cross section, the ends of which extend into the channels of the side sills 10 and are secured to the bases of the channels of the side sills through laterally extending flanges 14, by rivets or other fastening means. Reinforcing plates 15 are preferably secured to the top and bottom of each of the cross members and are in turn riveted or otherwise secured to the lateral flanges of the side sills.

The reference character 16 indicates a motor support cross member constituting the rear motor support, this member being mounted upon and rigidly connected to the side sills 10 by means of brackets 17. As shown more particularly in Figure 3 each bracket 17 has a peripheral portion 18 of an arcuate contour adapted to be secured by means of a plurality of bolts or other similar fastening means to the aforesaid motor support. The opposite edge portion of the bracket 17 is provided with a laterally extending flange 20 for connection with the side sills 10. The upper and lower edge of the bracket 17 is formed with a laterally extending web 21 of a substantially tri-angular configuration in plan view which webs extend from the extremities of the arcuate peripheral portion 18 to a point adjacent the lateral flange 20 where they terminate in substantially horizontal portions 22 adapted to lie adjacent and parallel with the lateral flanges of the side sills so as to enable the parts to be secured to the side sills at this point as for instance by means of rivets 23.

The reference character 24 indicates a longitudinally extending tubular torsional member, two of such members being shown in the present embodiment of the invention. Each torsional member 24 extends longitudinally as aforedescribed and is arranged adjacent to and substantially parallel with one of the side sills 10. These torsional members extend from the rearmost cross member 11 to the bracket 17 arranged in alignment with the motor support cross member.

Each of the cross members 11, 12 and 13 is provided with a pair of apertures for accommodating these torsional members. Each of the apertures has associated therewith a laterally extending circular flange 25 to afford an additional surface engagement between the cross members and the torsional members. Each torsional member is rigidly connected to the cross member 11, as for instance by welding the same thereto as indicated at 26 but extends through the flanged apertures in the cross members 12 and 13 without being rigidly united therewith. Each bracket 17 is provided with a torsional member receiving aperture also formed with a laterally extending circular flange 27, these torsional members extending through these apertures and projecting slightly beyond the brackets 17 as most clearly illustrated in Figure 1. The ends of the tubular members 24 are rigidly and nonrotatably secured to the bracket 17 as for instance by welding as indicated at 27.

Thus it will be seen that the tubular torsional members 24 are rigidly and nonrotatably connected at their ends to the cross member 11 on the one hand and the bracket 17 on the other, which latter element constitutes a part of the rear motor support cross member. These tubular members will fit snugly in the apertures of the intermediate cross members 12 and 13 but will not be nonrotatably secured thereto, this nonrotatable connection between the tubes and connecting members occurring only at the ends thereof. However, this construction forces these tubular torsional members to support the side rails throughout their length against vertical as well as horizontal forces. It has been found by experimental investigations and by the practical use of a construction as set forth, that highly useful and novel results are secured, to the attainment of which the construction and arrangement of the chassis as shown and described is demonstrably essential, but obviously these useful and novel results and the various advantages may be obtained irrespective of the number, construction and arrangement of the cross frame members employed. Consequently the underlying principles of the present invention as disclosed in the illustrative embodiment herein shown and described, is capable of expression in numerous ways and it should accordingly be understood that no limitations should be imposed upon the invention by reason of any of the details of construction or specific arrangements of parts herein shown and described, reservation being made to make such changes in the essential and all of the nonessential details as may come within the purview of the accompanying claims.

What we claim as our invention is:

1. In a vehicle chassis or frame construction, a pair of side sills, a frame cross member, a motor support cross member including brackets having spaced attaching webs rigidly connected to the sills and tubular torsional members extending substantially longitudinally of the chassis and rigidly connected to said frame cross member and brackets.

2. A motor vehicle frame comprising side sills, a bracket having spaced attaching webs connected to said sills, a torsional member connected to said bracket between the attaching webs thereof, and a motor support detachably carried by said bracket.

3. A motor vehicle frame comprising side sills, a pair of brackets having spaced attaching webs connected to said sills in opposed relation to each other, a torsional member connected to said brackets between the attaching webs thereof, a motor support detachably carried by said brackets, and a cross beam connected to said sills and having connection with said torsional member.

In testimony whereof we affix our signatures.

WILLIAM H. NEELY.
LOUIS THOMS.